United States Patent [19]
Spisak

[11] 3,809,849
[45] May 7, 1974

[54] WELDING TOOL
[75] Inventor: Steve Spisak, Elyria, Ohio
[73] Assignee: TRW Inc., Cleveland, Ohio
[22] Filed: June 7, 1973
[21] Appl. No.: 367,853

[52] U.S. Cl. ............................................. 219/98
[51] Int. Cl. ............................................. B23k 9/20
[58] Field of Search ......... 219/98, 99, 127; 74/531, 74/25; 188/67

[56] References Cited
UNITED STATES PATENTS
3,291,958 6/1964 Glorioso .............................. 219/98
2,670,058 2/1954 Landrum ............................. 188/67
2,443,697 6/1948 Smith ................................... 74/531
3,242,307 3/1966 Mowry et al ......................... 219/98

Primary Examiner—J. V. Truhe
Attorney, Agent, or Firm—Allen D. Gutchess, Jr.

[57] ABSTRACT

An improved welding tool for welding studs to workpieces by a drawn-arc welding technique is provided. A lifting mechanism for the welding tool provides a stronger grip and a more uniform amount of overtravel of the chuck assembly. This is made possible by the design of a lifting hook and ring which enables the use of a larger spring for the lifting mechanism with the spring engaging the lifting ring near its periphery.

9 Claims, 3 Drawing Figures

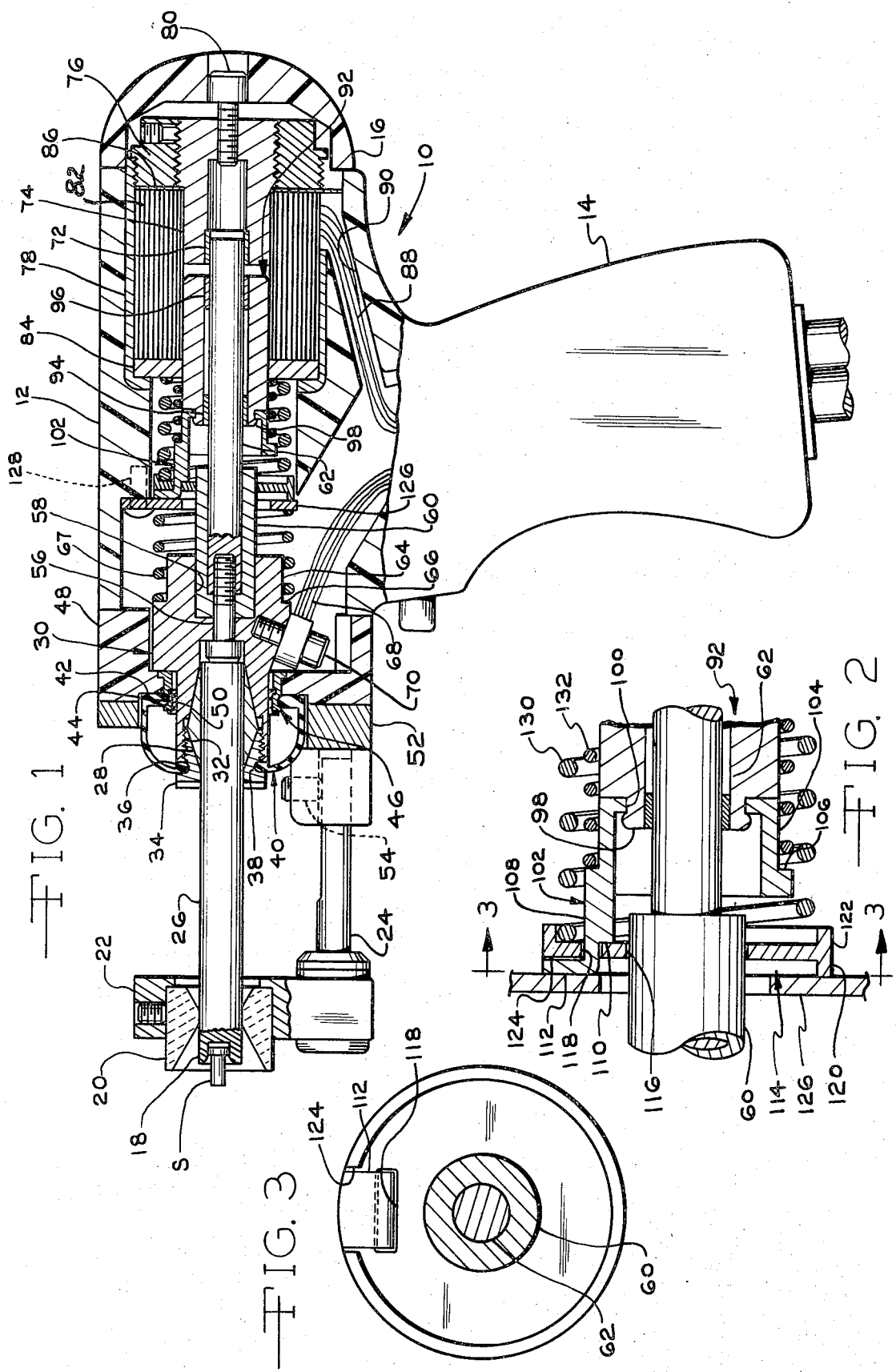

WELDING TOOL

This invention relates to a welding tool for welding studs to workpieces by means of a drawn-arc welding technique.

A welding tool for affixing studs to workpieces by means of drawn-arc welding includes a chuck assembly having a chuck which holds the stud against the workpiece and which retracts the stud from the workpiece as a pilot arc is initiated. A main welding arc is imposed on the pilot arc and the chuck plunges the stud against the workpiece, preferably while the main welding arc still persists, with pools of molten metal on the surface of the workpiece and on the end of the stud then joining and solidifying to secure the stud to the workpiece. The chuck assembly must be able to yieldably retract in the stud welding tool as the stud is initially pushed against the workpiece, and yet the chuck assembly must be engaged by lifting mechanism in the welding tool to retract the chuck assembly and the stud from the workpiece during the welding process. Heretofore, when the lifting mechanism retracted the chuck assembly, a certain amount of over-travel would exist, the chuck assembly actually retracting to a greater extent than the lifting mechanism because the inertia of the chuck assembly causes it to move slightly farther after the lifting mechanism has stopped. If the amount of over-travel is constant, it does not present a problem since the tool can be adjusted to compensate for it. However, if the degree of over-travel varies from stud to stud, then the weld quality will not be uniform since the studs will be retracted from the workpiece to varying extents and the relationship between the main welding arc and the plunging of the stud toward the workpiece will not be uniform.

The present invention provides an improved welding tool and specifically a welding tool having an improved lifting mechanism therein. The lifting mechanism includes a lifting ring through which a portion of the chuck assembly extends and a lifting hook which is engageable with the ring. The hook is designed so that a spring of the lifting mechanism extends around the hook and engages an outer peripheral portion of the lifting ring. The spring thus can be larger and stronger than heretofore and causes the lifting ring to engage or "bite" the chuck assembly more effectively. This design has been found to provide a more uniform degree of over-travel so that weld quality can be more constant than heretofore.

It is, therefore, a principal object of the invention to provide an improved welding tool for welding studs to workpieces by a drawn-arc end welding technique.

Another object of the invention is to provide an improved welding tool having an improved lifting mechanism.

A further object of the invention is to provide a lifting mechanism for a welding tool, which mechanism has a larger diameter spring to produce a more effective engagement of a lifting ring of the mechanism with a chuck assembly of the tool.

Yet another object of the invention is to provide an improved lifting mechanism for a stud welding tool, which mechanism produces a more uniform amount of over-travel for the studs.

Many other objects and advantages of the invention will be apparent from the following detailed description of a preferred embodiment thereof, reference being made to the accompanying drawings, in which:

FIG. 1 is a side view in elevation, with parts broken away and with parts in section, of a welding tool embodying the invention;

FIG. 2 is a greatly enlarged, fragmentary view in longitudinal cross section of a portion of the welding tool of FIG. 1; and FIG. 3 is a view in cross section taken along the line 3—3 of FIG. 2.

Referring to the drawings, a stud welding tool 10 according to the invention is used to weld a stud designated S to a workpiece by means of a drawn-arc method. The tool must include means for retracting the stud from the workpiece, means for holding the stud in the retracted position for a predetermined period, and means for moving or plunging the stud toward and against the workpiece at the end of the predetermined period. As the stud is retracted from the workpiece, a pilot arc is drawn therebetween and a main welding arc is subsequently imposed on the pilot arc with the main arc preferably maintained until the stud is plunged back against the workpiece.

The tool 10 includes a main body or housing 12 of suitable dielectric material, the body having an integral pistol grip 14 and a separate rear end cap 16. A chuck 18 is located at the front of the tool 10 and holds the stud S during the welding operation. In this instance, the chuck is surrounded by a permanent spark shield 20 attached to a welding foot 22 which, in turn, is adjustably supported by two legs 24, as is known in the art. A ceramic ferrule can be used in place of the permanent spark shield 20 for some applications, if desired.

The chuck 18, in this instance, is structurally integral with a chuck leg 26. A tapered collet 28 holds the chuck leg 26 in a cable clamp 30 which has a forward tapered recess 32 receiving a nut 34 for the collet 28. The nut 34 has an annular groove 36 which receives an annular bead 38 of a flexible dust bellows 40. The bellows 40 has an inwardly extending, annular rear flange or lip 42 which is received in an annular groove 44 in a metal insert 46 molded into a front cover 48 of the housing. A nylon bearing 50 in the form of a split ring is mounted on the inner edge of the insert 46 and serves as a slidable bearing support for the cable clamp 30 and the chuck leg 26. A leg adapter 52 is affixed to the front cover 48 by side screws (not shown) and contains passages to receive the legs 24 which are adjustably held by setscrews 54.

A machine screw 56 is carried by the cable clamp 30 immediately behind the chuck leg 26 and extends rearwardly into a recess 58 in the cable clamp. The machine screw projects through an opening in a lifting rod sleeve 60 and is threadedly engaged in a lifting rod 62 received in the sleeve. The cable clamp 30 also has a cylindrical extension 64 around the recess 58 and forms a shoulder 66 against which a forward end of a main plunge spring 67 is seated. A welding cable 68 is affixed to the cable clamp 30 by a terminal fastener 70.

The rear portion of the lifting rod 62 is slidably supported in a bearings 72 affixed in an adjustable core stop 74. The bearing 50 and 72 thereby provide widely spaced supports for the chuck assembly which includes the chuck 18, the chuck leg 26, the cable clamp 30, the lifting rod sleeve 60, and the lifting rod 62. This wide spacing of the bearing produces accurate positioning of the chuck 18 and minimizes any possibility of wobble of the chuck and the stud during the welding operation. The adjustable core stop 74 is threaded in a collar 76 which is threaded in and bottoms on an end of a coil tube 78. The rear cap 16 has a threaded fastener 80 which supports the cap through the core stop 74. An electrical coil 82 of conventional construction is located within the coil tube 78, with a front coil yoke 84 being located at the front of the coil tube. A rear divider 86 separates the coil from the collar 76. The coil is supplied with power through conductors 88 located in a passage 90 in the tool body and extending downwardly and out through the bottom of the handle 14, along with the welding cable 68.

A movable core 92 is located in the coil 82 in front of the adjustable stop 74 and has two bronze bearings 94 and 96 thereon which reduce the possibility of corrosion and provide a better sliding surface for the lifting rod 62. A forward projecting portion 98 (FIG. 2) of the movable core 92 is flared outwardly after extending through an opening 100 of a lifting hook 102 to firmly affix the core to the hook. The lifting ring hook has a rear cylindrical portion 104 forming a shoulder 106 and a forwardly extending shank 108 forming a forward shoulder or offset 110 and terminating in an outwardly extending tab or ring-engaging portion 112.

A lifting ring 114 has a center opening 116 through which the lifting rod 62 and the sleeve 60 extend, and an intermediate opening 118, located about half-way between the opening 116 and the periphery of the ring, through which the tab 112 extends, with the shoulder 110 abutting the back surface of the lifting ring 102. The lifting ring 114 also has an outer rim which forms a forwardly extending flange 120 and a rearwardly extending flange 122. The forwardly extending flange 120 has a notch 124 which receives the outer end of the tab 112 with the flange 120 extending forwardly a distance exceeding the thickness of the tab 112. The forward annular edge of the front flange 120 abuts a stop or supporting plate 126 which is held in the body 12 by fasteners 128.

The lifting ring 114 is held against the stop plate by an outer ring spring 130, the forward end of which seats against the lifting ring immediately inside the rearwardly extending flange 122, the rear end of the spring seating against the front coil yoke 84. With the lifting hook 102 being of small diameter and having the tab 112 extending through the ring 114 rather than around it, the spring 130 can be located around the lifting hook and engage the ring 114 near the perimeter thereof. This provides a larger force of the spring 130 on the lifting ring 114 due to the peripheral engagement of the spring with the ring and due to the size of the spring made possible by its larger diameter. In turn, the lifting ring 114 provides a better bite on the sleeve 60 which improves the operation of the welding tool. The stronger bite of the ring on the sleeve also has been found to provide a more uniform amount of over-travel of the chuck leg 26, the sleeve 60, and the rod 62 as they are moved rearwardly by the ring 114, the hook 102, and the movable core 92. The more uniform over-travel enables the welding tool to produce more uniform welds.

The lifting hook 102 is also urged forwardly with the tab 112 against the stop plate 126 by means of a smaller core spring 132 engaging the shoulder 106. With the tab against the stop plate, a gap results between the tab and the forward annular surface of the lifting ring 114. Consequently, the hook acts in a uniform manner on the ring as the hook is retracted to cant the ring and cause it to bite into the sleeve. Without the spring 132, the position of the tab 112 relative to the ring 114 would vary depending upon the position of the welding tool 10, e.g., whether it is in an overhead welding position or a down-hand welding position, by way of example. If there were no gap and the tab 112 were exactly equal in thickness to the forward extent of the flange 120, the spring 132 would not be required. However, the gap between the tab 112 and the ring 114 is desirable to accommodate any dirt or contamination on the rear surface of the stop plate 126, on the forward annular surface of the lifting ring 114, or on either side of the tab 112. If such dirt would accumulate, the lifting ring 114 would be canted when in the forward position near the stop plate and might then bite into the lifting sleeve 60; under these circumstances, the chuck could not be retracted to its initial welding position with the stud S flush with the forward edge of the spark shield 20.

While the operation of the welding tool 10 will be apparent from the above description, it will be briefly reviewed. With the stud S in the chuck 18, the tool is pressed toward the workpiece until the end of the stud S becomes flush with the forward edge of the spark shield 20, as the shield 20 contacts the workpiece. During this movement, the chuck leg 26, the cable clamp 30, the lifting sleeve 60, and the lifting rod 62 move back against the force of the plunge spring 67. Because the lifting ring 114 is perpendicular to the sleeve and rod at this time, the lifting ring has no effect on the movement of the chuck assembly and specifically the sleeve 60 thereof. When the trigger is pulled, a voltage potential is established through the welding cable 68 between the stud and the workpiece. Substantially at this time, power is supplied to the coil 82 through the rear conductors 88 to cause the movable core 92 to retract. As the core 92 begins to retract, it moves the lifting hook 102 rearwardly, causing the tab to engage the front surface of the lifting ring 114, overcoming the force of the springs 130 and 132, and causing the lifting ring to move to the slanted position. At this time, the edges of the central opening 116 bite on the sleeve 60 and cause it and the rest of the chuck assembly to move rearwardly, retracting the stud from the workpiece and establishing a pilot arc.

The rear movement of the stud S continues until the movable core 92 abuts the adjustable core stop 74. When the movable core 92 abuts the core stop 74, the sleeve 60 and the leg 62 tend to move further rearwardly due to inertia. However, with the stronger bite established by the lifting ring 114, the amount of over-travel is controlled in a more uniform manner so that more uniform welds will result. The lifting ring and hook thereby enable the welding tool to produce better, higher quality welds and more uniform ones.

Subsequently, the power to the coil 82 is shut off, at which time the main plunge spring 67, through the cable clamp 30, moves the stud S toward the workpiece. A main welding arc is also established between the stud and the workpiece with this arc being maintained until the stud substantially contacts the workpiece. This assures that the molten pools of metal formed by the main welding arc remain molten until the stud and workpiece come together.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A welding tool comprising a chuck assembly including a chuck, a supporting plate around a portion of said chuck assembly, a movable core around a portion of chuck assembly behind said supporting plate, a lifting hook affixed to a forward portion of said movable core and extending forwardly toward said supporting plate along a portion of said chuck assembly, said lifting hook having a tab on a forward end thereof extending outwardly away from said movable core, a first spring around a portion of said lifting hook and urging said lifting hook forwardly with said tab against said supporting plate, a lifting ring having an opening through which said lifting hook extends, and a second spring around said lifting hook and engaging said lifting ring outside of said lifting ring opening and urging said ring toward said supporting plate.

2. A welding tool according to claim 1 characterized by said lifting ring having an annular flange extending forwardly thereof toward said supporting plate, said flange extending a distance exceeding the thickness of said lifting hook tab.

3. A tool according to claim 2 characterized by said annular flange having a notch therein, with said tab extending into said notch.

4. A tool according to claim 1 characterized by said lifting hook having an annular shoulder against which said first spring bears.

5. A tool according to claim 1 characterized by said lifting ring having an annular flange extending rearwardly thereof and aiding in retaining said second spring in engagement with said lifting ring.

6. A welding tool comprising a welding tool body, a chuck assembly including a chuck positioned forwardly of said body, said chuck assembly extending into said tool body, a supporting plate around a portion of said chuck assembly in said body, means for retracting said chuck assembly in said body to retract said chuck away from a workpiece, a lifting hook affixed to said retracting means and extending toward said supporting plate along a portion of said chuck assembly, a lifting ring having means cooperating with a portion of said lifting hook to enable said lifting hook to move said lifting ring, a spring around said lifting hook and engaging said lifting ring near the periphery thereof to urge said lifting ring toward said supporting plate, said lifting hook portion comprising a tab, and said lifting ring means comprising an opening spaced from the periphery of said lifting ring through which said lifting hook extends to enable said tab to engage the surface of said lifting ring closer to said supporting plate.

7. A welding tool according to claim 6 characterized by said lifting ring having an annular flange extending toward said supporting plate, said flange extending a distance exceeding the thickness of said lifting hook tab.

8. A welding tool according to claim 7 characterized by said annular flange having a notch therein, with said tab extending into said notch.

9. A welding tool according to claim 6 characterized by said lifting ring having an annular flange extending rearwardly thereof and aiding in retaining said spring in engagement with said lifting ring.

* * * * *